US005320568A

United States Patent [19]
Koerkel, Jr.

[11] Patent Number: 5,320,568
[45] Date of Patent: Jun. 14, 1994

[54] SWIMMING POOL ANIMAL ESCAPE DEVICE

[76] Inventor: Charles J. Koerkel, Jr., Jamestowne Apts. Bldg. 12, Apt. 1, Toms River, N.J. 08753

[21] Appl. No.: 61,591

[22] Filed: May 17, 1993

[51] Int. Cl.⁵ .................................................. B63C 9/00
[52] U.S. Cl. ........................................ 441/129; 441/29
[58] Field of Search ................ 441/1, 28, 29, 67, 129, 441/130, 131, 136, 35; 472/128, 129

[56] References Cited

U.S. PATENT DOCUMENTS

| 3,374,494 | 3/1968 | Hunley | 441/29 |
| 3,652,090 | 3/1972 | Semmens | 441/28 X |
| 3,780,686 | 12/1973 | Brill | 441/1 X |
| 3,916,467 | 11/1975 | Curd, Jr. | 441/28 |
| 3,942,203 | 3/1976 | Perkins | 441/28 |

Primary Examiner—Sherman Basinger
Attorney, Agent, or Firm—E. Michael Combs

[57] ABSTRACT

A floating device is arranged to provide for a stepped platform to permit accommodation of an animal trapped within a swimming pool environment, wherein the stepped platform includes a plurality of concentric rings, with an uppermost boss having a concave recess to accommodate an individual animal permitting the animal to escape the surrounding body of water. The invention is arranged to include a modified aspect to permit ballast structure to enhance stability within the water.

2 Claims, 4 Drawing Sheets

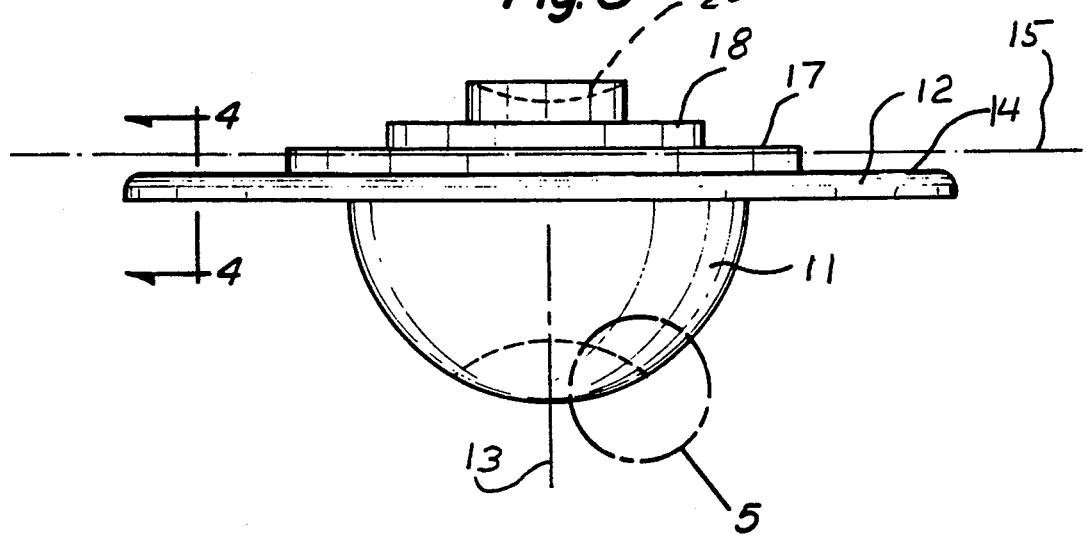
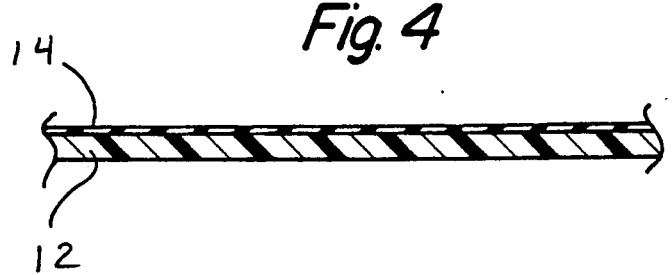
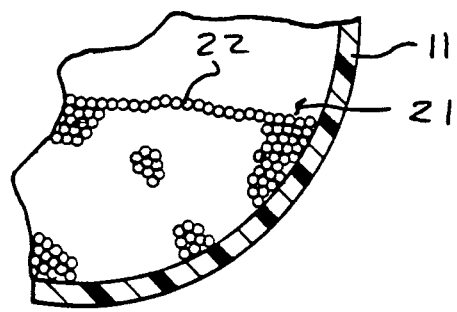

SWIMMING POOL ANIMAL ESCAPE DEVICE

BACKGROUND OF THE INVENTION

1. Field of the Invention

The field of invention relates to a swimming floating device, and more particularly pertains to a swimming pool animal escape device permitting an animal to escape relative to a surrounding body of water.

2. Description of the Prior Art

Flotation structure such as floats and the like typically positioned within a swimming pool, such as exemplified in the U.S. Pat. No. Des. 309,169, do not permit an animal such as a squirrel and the like that has fallen within a body of water egress from that body of water. U.S. Pat. No. 4,972,540 to Phelps indicates a ramp-type structure permitting an animal to escape from an associated swimming pool.

The instant invention attempts to overcome deficiencies of the prior art by providing for a floating device having a stepped top wall surface with an initial step positioned below a water line permitting access of the animal to an uppermost support cylinder to accommodate an animal in relative safety and in this respect, the present invention substantially fulfills this need.

SUMMARY OF THE INVENTION

In view of the foregoing disadvantages inherent in the known types of rescue apparatus now present in the prior art, the present invention provides a swimming pool animal escape device wherein the same is arranged to accommodate an animal relative to a surrounding body of water. As such, the general purpose of the present invention, which will be described subsequently in greater detail, is to provide a new and improved swimming pool animal escape device which has all the advantages of the prior art flotation apparatus and none of the disadvantages.

To attain this, the present invention provides a floating device arranged to provide for a stepped platform to permit accommodation of an animal trapped within a swimming pool environment, wherein the stepped platform includes a plurality of concentric rings, with an uppermost boss having a concave recess to accommodate an individual animal permitting the animal to escape the surrounding body of water. The invention is arranged to include a modified aspect to permit ballast structure to enhance stability within the water.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved swimming pool animal escape device which has all the advantages of the prior art flotation apparatus and none of the disadvantages.

It is another object of the present invention to provide a new and improved swimming pool animal escape device which may be easily and efficiently manufactured and marketed.

It is a further object of the present invention to provide a new and improved swimming pool animal escape device which is of a durable and reliable construction.

An even further object of the present invention is to provide a new and improved swimming pool animal escape device which is susceptible of a low cost of manufacture with regard to both materials and labor, and which accordingly is then susceptible of low prices of sale to the consuming public, thereby making such swimming pool animal escape devices economically available to the buying public.

Still yet another object of the present invention is to provide a new and improved swimming pool animal escape device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the invention.

FIG. 4 is an orthographic view, taken along the lines 4—4 of FIG. 3 in the direction indicated by the arrows.

FIG. 5 is an enlarged cross-sectional illustration of section 5 as set forth in FIG. 3.

DESCRIPTION OF THE PREFERRED EMBODIMENT

Figure 1:
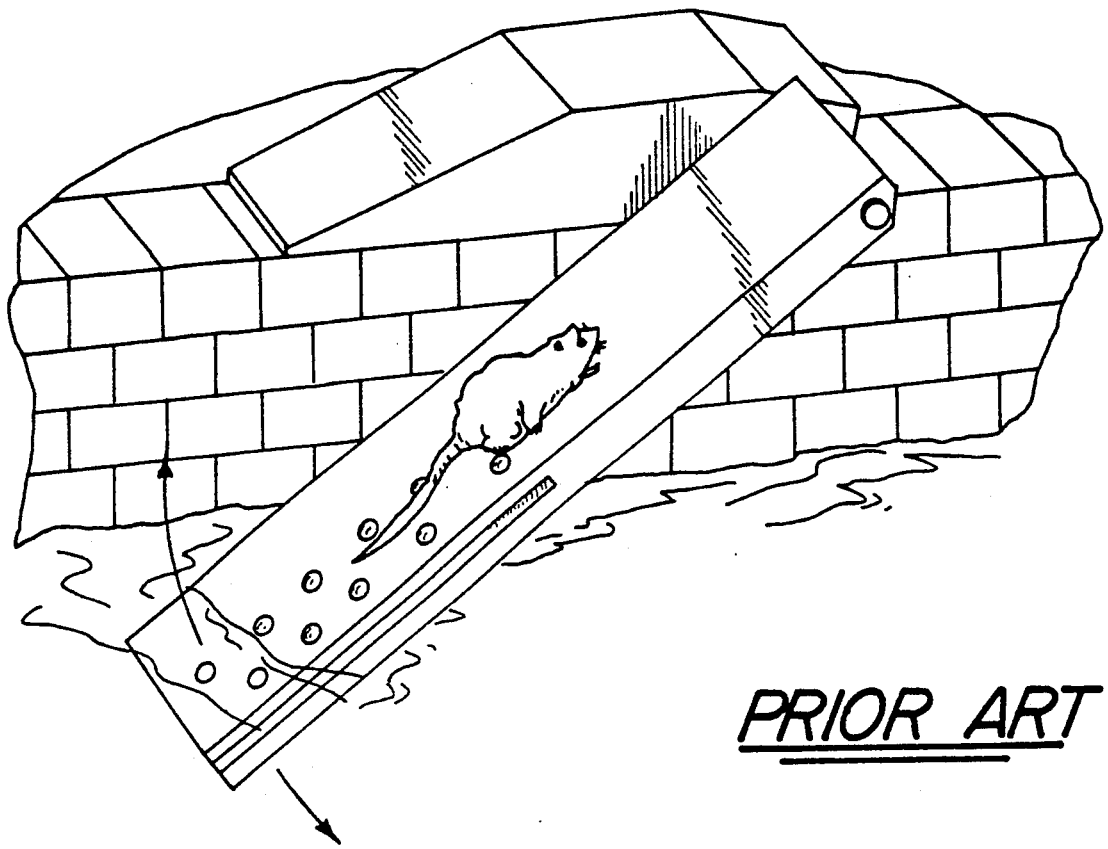
FIG. 1 is an isometric illustration of a prior art animal escape ramp structure, as indicated in U.S. Pat. No. 4,972,540.

With reference now to the drawings, and in particular to FIGS. 1 to 9 thereof, a new and improved swimming pool animal escape device embodying the principles and concepts of the present invention and generally designated by the reference numerals 10 and 10a will be described.

More specifically, the swimming pool animal escape device 10 of the instant invention essentially comprises a semi-spherical housing 11 symmetrically oriented about a housing axis 13, that includes a cylindrical roof plate 12 orthogonally oriented relative to the axis 13 and fixedly mounted to an equatorial periphery of the spherical housing 11. The roof plate 12 is defined by a first diameter. Respective first and second step plates 17 and 18 of cylindrical configuration are mounted concentrically relative to the roof plate in a stepped relationship, wherein the first step plate 17 is of a second diameter less than the first diameter, and the second step plate 18 is of a third diameter less than the second diameter, with the first step plate mounted to the roof plate, and a second step plate mounted to the step plate. A resilient web 14 is mounted coextensively to the exterior surface of the roof plate 12, the first step plate 17, and the second step plate 18 to provide for a frictional surface for enhance engagement by an animal ascending the steps towards a central support cylinder mounted to the second step plate 18. The support cylinder includes a concave top wall 20 to accommodate an animal thereon in a secure relationship.

Figure 2:
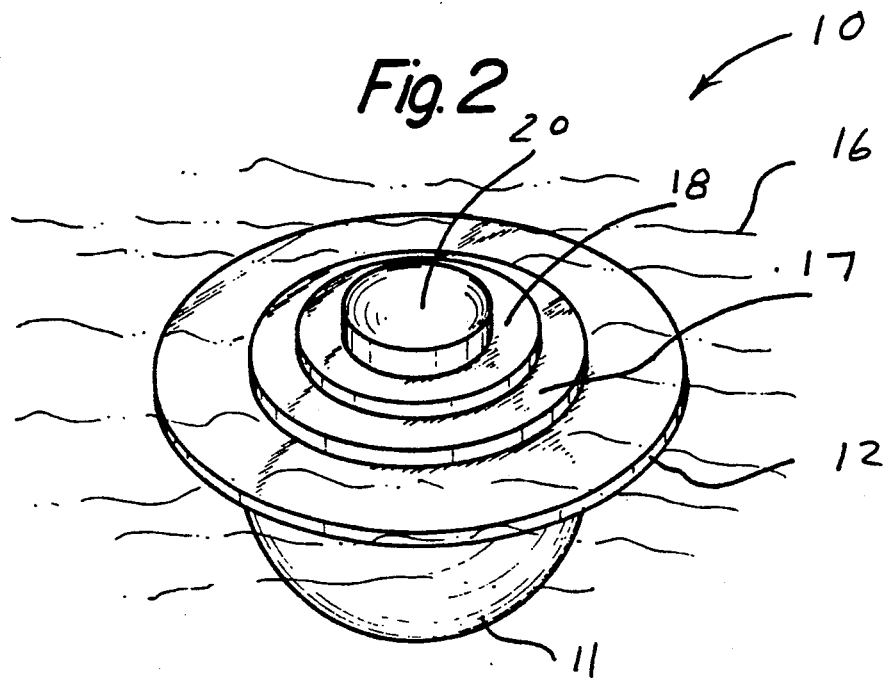
FIG. 2 is an isometric illustration of the invention.
Figure 6:
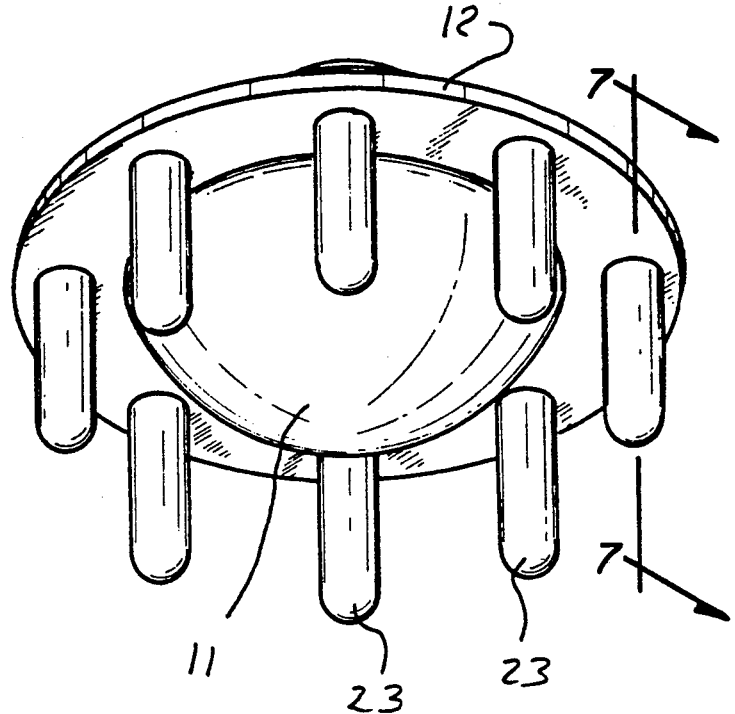
FIG. 6 is an isometric bottom view of a modified aspect of the invention.
Figure 7:
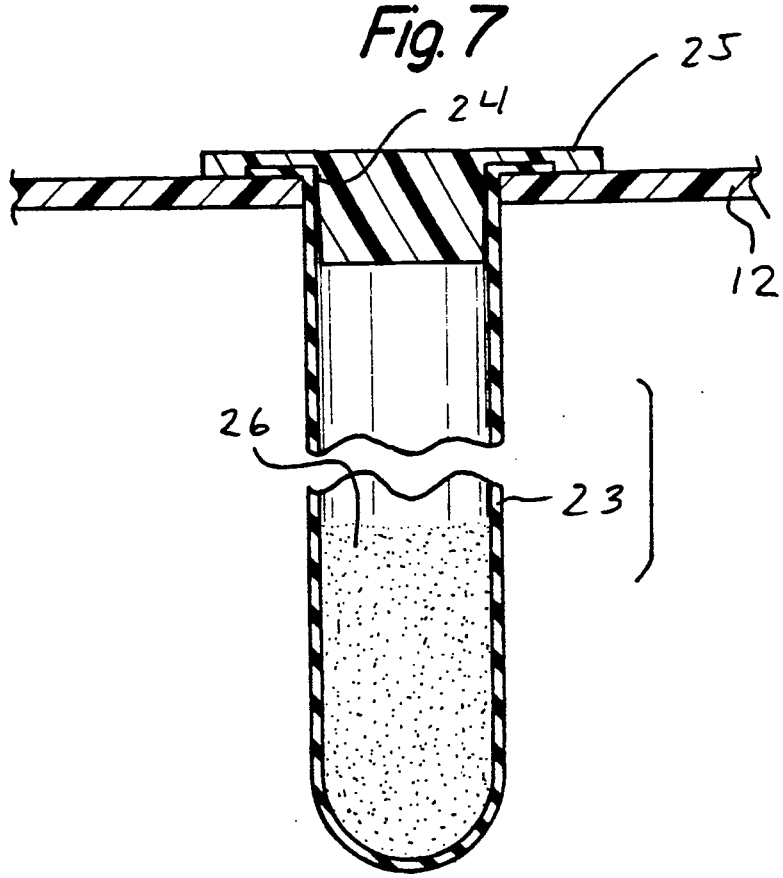
FIG. 7 is an orthographic view, taken along the lines 7—7 of FIG. 6 in the direction indicated by the arrows.
Figure 8:
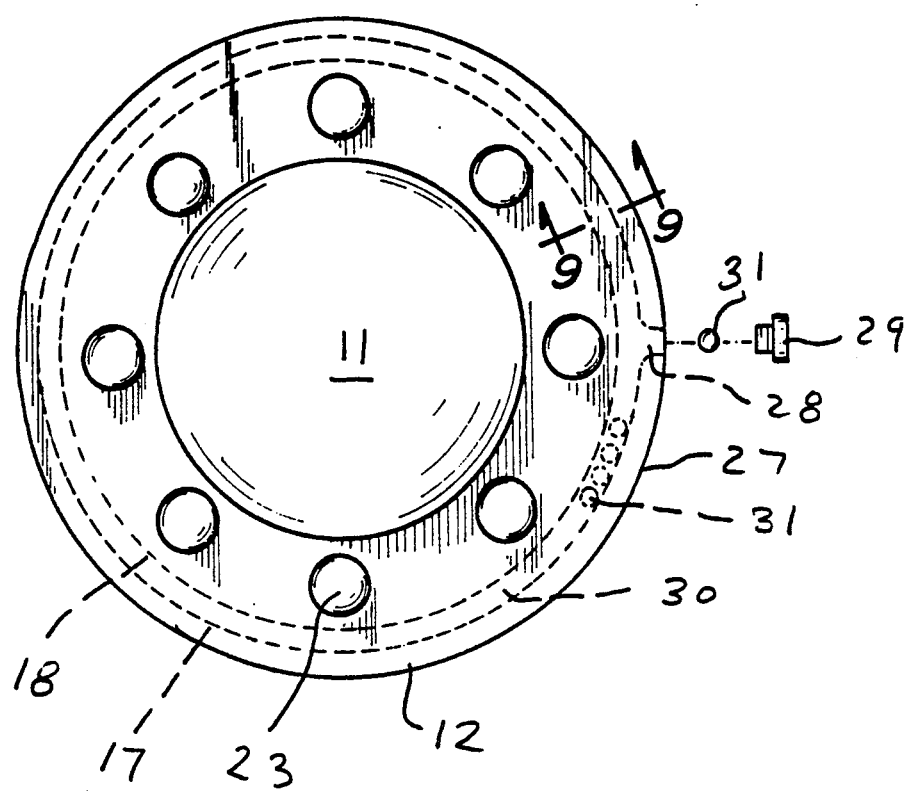
FIG. 8 is an orthographic bottom view of the structure as set forth in FIG. 6.
Figure 9:
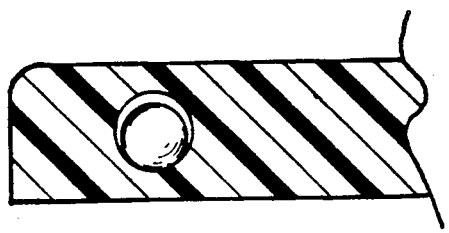
FIG. 9 is an orthographic view, taken along the lines 9—9 of FIG. 8 in the direction indicated by the arrows.

The housing 11 includes a housing cavity 21 to include a plurality of ballast spherical shot members 22 (such as of lead and the like) contained within the housing cavity to impart stability to the housing and to effect positioning of the roof plate 12 below the water line 15 of a body of water 16, such as indicated in the FIGS. 2 and 3.

The apparatus as indicated as 10a in the FIGS. 6–9 includes an annular array of stabilizing tubes 23 spaced an equal distance relative to one another and orthogonally directed through the roof plate 12, with the tubes 23 concentric relative to the axis 13. Each tube 23 includes an entrance opening 24 spaced above the roof plate 12 to accommodate a plug 25 therewithin to permit positioning of ballast particular 26 within each tube to provide for stability and to further provide for ease of positioning of the roof plate below the water line 15. The roof plate includes an annular periphery 27 (see FIG. 8) having an annular periphery entrance 28 to accommodate an annular periphery plug 29. Through the annular periphery entrance 28 is accessed an annular channel 30 positioned adjacent the periphery and concentric relative to the axis 13 to rotatably receive further spherical shot 31 therewithin. The spherical shot extend through the annular channel 30 to define an arc of less than one hundred eighty degrees and preferably less than ninety degrees. In this manner, an animal attempting to access the roof plate 12 rotates the further spherical shot 31 towards the tipping of the roof plate to thereby enhance tipping of the roof plate imparting such stability to enhance an animals ease of access to the roof plate and subsequently to the support cylinder 19 and the concave top wall 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A swimming pool animal escape device, comprising, a semi-spherical housing, the semi-spherical housing symmetrically oriented about a housing axis, and having an annular equatorial periphery of the spherical housing, with the equatorial periphery including a roof plate fixedly mounted thereon symmetrically and orthogonally oriented relative to the axis, the roof plate includes a first step plate fixedly mounted to the roof plate exteriorly of the housing, and the first step plate including a second step plate, and a support cylinder mounted to the second step plate, with the support cylinder, the second step plate, the first step plate, and the roof plate of cylindrical configuration and concentric about the axis, and the support cylinder includes a concave top wall to accommodate an animal thereon, and the roof plate, the first step plate, and the second step plate include a resilient web coextensive therewith to provide for enhanced frictional engagement of an animal onto the roof plate, the first step plate, and the second step plate, and the housing includes a housing cavity remotely oriented relative to the roof plate, and the housing cavity including ballast shot positioned therewithin to afford stability to the housing, and the roof plate includes an annular array of stabilizing tubes orthogonally directed through the roof plate extending from the roof plate in adjacency to the spherical housing, and the tubes concentric relative to the axis, and the tubes each include a tube entrance opening positioned above the roof plate between the roof plate and the first step plate, and each tube entrance opening including an entrance opening plug, and at least one of said stabilizing tubes includes ballast particulate therewithin.

2. A device as set forth in claim 1 wherein the roof plate includes a roof plate annular periphery, the annular periphery including an annular periphery entrance, and the annular periphery entrance including a roof plate plug removably mounted into the annular periphery entrance, and an annular channel mounted within the roof plate in adjacency to the roof plate annular periphery, and the annular channel in communication with the annular periphery entrance, and a plurality of further spherical shot positioned within the annular channel accessed into the annular channel through the annular periphery entrance, and the further spherical shot at an arcuate angle less than one hundred eighty degrees within the annular channel.

* * * * *